US009813929B2

(12) United States Patent
Wirola et al.

(10) Patent No.: US 9,813,929 B2
(45) Date of Patent: Nov. 7, 2017

(54) OBTAINING INFORMATION FOR RADIO CHANNEL MODELING

(71) Applicant: Nokia Technologies Oy, Espoo (FI)

(72) Inventors: Lauri Aarne Johannes Wirola, Tampere (FI); Laura Wirola, Tampere (FI)

(73) Assignee: Nokia Technologies Oy, Espoo (FI)

( * ) Notice: Subject to any disclaimer, the term of this patent is extended or adjusted under 35 U.S.C. 154(b) by 25 days.

(21) Appl. No.: 14/655,431

(22) PCT Filed: Jan. 11, 2013

(86) PCT No.: PCT/IB2013/050269
§ 371 (c)(1),
(2) Date: Jun. 25, 2015

(87) PCT Pub. No.: WO2014/108757
PCT Pub. Date: Jul. 17, 2014

(65) Prior Publication Data
US 2015/0350943 A1 Dec. 3, 2015

(51) Int. Cl.
*H04W 24/10* (2009.01)
*H04L 12/26* (2006.01)
*H04W 64/00* (2009.01)
*G01S 5/02* (2010.01)

(52) U.S. Cl.
CPC ............ *H04W 24/10* (2013.01); *G01S 5/021* (2013.01); *G01S 5/0252* (2013.01); *H04L 43/0864* (2013.01); *H04W 64/00* (2013.01)

(58) Field of Classification Search
CPC .................................................... H04W 24/10
See application file for complete search history.

(56) References Cited

U.S. PATENT DOCUMENTS

| 2007/0032248 | A1 | 2/2007 | Ogino et al. |
| 2008/0188237 | A1* | 8/2008 | Alles ............... G01S 5/021 455/456.1 |
| 2010/0135178 | A1 | 6/2010 | Aggarwal et al. |
| 2011/0039580 | A1 | 2/2011 | Wigren et al. |

FOREIGN PATENT DOCUMENTS

WO   2010101552 A1   9/2010

OTHER PUBLICATIONS

International Search Report received for corresponding Patent Cooperation Treaty Application No. PCT/IB2013/050269, dated Sep. 30, 2013, 7 pages.

* cited by examiner

*Primary Examiner* — John Blanton
(74) *Attorney, Agent, or Firm* — Harrington & Smith

(57) ABSTRACT

An apparatus obtains information for radio channel modeling by checking at least one measurement based value of at least one set of measurement based values of a plurality of sets of measurement based values based on at least one timing measurement value, wherein each set of measurement based values originates from a respective mobile terminal in a communication network (111). The same or another apparatus may perform a radio channel modeling based on the obtained information (112).

20 Claims, 6 Drawing Sheets

FIG. 4

OBTAINING INFORMATION FOR RADIO CHANNEL MODELING

RELATED APPLICATION

This application was originally filed as Patent Cooperation Treaty Application No. PCT/IB2013/050269 filed Jan. 11, 2013.

FIELD OF THE DISCLOSURE

The invention relates to obtaining information for radio channel modeling.

BACKGROUND

Modern global cellular and non-cellular positioning technologies are based on generating large global databases containing information on cellular and non-cellular signals. The information may originate entirely or partially from users of these positioning technologies. This approach is also referred to as "crowd-sourcing".

The information provided by users is typically in the form of "fingerprints", which contain a location that is estimated based on, e.g., received satellite signals of a global navigation satellite system (GNSS) and measurements taken from one or more radio interfaces for signals of a cellular and/or non-cellular terrestrial system. In the case of measurements on cellular signals, the results of the measurements may contain a global and/or local identification of the cellular network cells observed, their signal strengths and/or pathlosses and/or timing measurements like timing advance (TA) or round-trip time. For measurements on wireless local area network (WLAN) signals, as an example of signals of a non-cellular system, the results of the measurements may contain a basic service set identification (BSSID), like the medium access control (MAC) address of observed access points (APs), the service set identifier (SSID) of the access points, and the signal strength of received signals (received signal strength indication RSSI or physical Rx level in dBm with a reference value of 1 mW, etc.).

This data may then be transferred to a server or cloud, where the data may be collected and where further models may be generated based on the data for positioning purposes. Such further models can be coverage area estimates, node positions and/or radio channel models, with base stations of cellular communication networks and access points of WLANs being exemplary nodes. In the end, these refined models may be used for estimating the position of mobile terminals.

Fingerprints do not necessarily have to comprise a GNSS based position. They could also include cellular and/or WLAN measurements only. In this case the fingerprint could be assigned a position for example based on a WLAN based positioning in a server. Such self-positioned fingerprints can be used to learn cellular network information, in case there are cellular measurements in the fingerprint. Moreover, in a set of WLAN measurements in a fingerprint there may be, in addition to measurements for known WLAN access points, also measurements for unknown access points, and the position of the unknown access points can be learned through these self-positioned fingerprints. Finally, more data can be learned for previously known access points based on self-positioned fingerprints.

It may be noted that even when using a mobile terminal having GNSS-capabilities, a user may benefit from using cellular/non-cellular positioning technologies in terms of time-to-first-fix and power consumption. Also, not all applications require a GNSS-based position. Furthermore, cellular/non-cellular positioning technologies work indoors as well, which is generally a challenging environment for GNSS-based technologies.

SUMMARY OF SOME EMBODIMENTS OF THE INVENTION

A method is described which comprises at at least one apparatus obtaining information for radio channel modeling by checking at least one measurement based value of at least one set of measurement based values of a plurality of sets of measurement based values based on at least one timing measurement value, wherein each set of measurement based values originates from a respective mobile terminal in a communication network, and performing a radio channel modeling based on the obtained information.

Moreover a first system is described, which comprises means for realizing the actions of the presented method.

The means of the system can be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means.

Moreover a second system is described, which comprises at least one processor and at least one memory including computer program code, the at least one memory and the computer program code configured to, with the at least one processor, cause at least one apparatus at least to perform the actions of the presented method.

Any of the described systems may be an apparatus or comprise a plurality of apparatuses. In the latter case, the means of the presented first system could be distributed for instance to a plurality of apparatuses. Similarly, the at least one processor and the at least one memory of the presented second system could be distributed for instance to a plurality of apparatuses. Any mentioned apparatus may be a module or a component for a device, for example a chip. Alternatively, any of the mentioned apparatuses may be a device, for instance a server.

Any of the described systems may further comprise only the indicated components or one or more additional components. For example, any of the systems may optionally comprise in addition a database storing the plurality of sets of measurement based values and/or a mobile terminal or another apparatus providing a set of measurement based values.

In certain embodiments, the described methods are information providing methods, and the described systems are or comprise information providing apparatuses.

In certain embodiments of the described methods, the methods are methods for obtaining information for radio channel modeling by checking at least one measurement based value of at least one set of measurement based values of a plurality of sets of measurement based values based on at least one timing measurement value. In certain embodiments of the described systems, the systems are systems for obtaining information for radio channel modeling by checking at least one measurement based value of at least one set of measurement based values of a plurality of sets of measurement based values based on at least one timing measurement value.

Moreover a non-transitory computer readable storage medium is described, in which computer program code is stored. The computer program code causes at least one apparatus to perform the actions of the presented method when executed by at least one processor.

The computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood also the respective computer program code by itself has to be considered an embodiment of the invention. The computer program code could also be distributed to several computer readable storage mediums.

It is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 4 is a diagram illustrating an exemplary grids of timing measurement values and signal strength values;

DETAILED DESCRIPTION OF THE FIGURES

Figure 1:
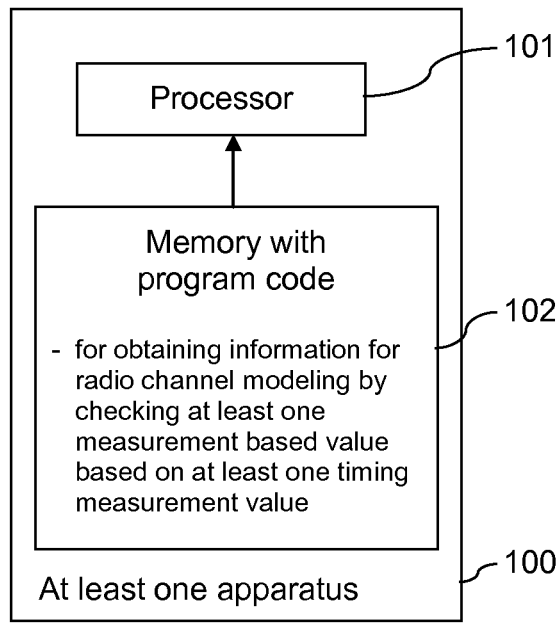
FIG. 1 is a schematic block diagram of an exemplary embodiment of at least one apparatus.

FIG. 1 is a schematic block diagram of an exemplary embodiment of a system in the form of an exemplary apparatus 100. Apparatus 100 comprises a processor 101 and, linked to processor 101, a memory 102. Memory 102 stores computer program code for obtaining information for radio channel modeling by checking at least one measurement based value of at least one set of measurement based values of a plurality of sets of measurement based values based on at least one timing measurement value. Processor 101 is configured to execute computer program code stored in memory 102 in order to cause an apparatus to perform desired actions.

Apparatus 100 could be a server or any other device. Apparatus 100 could equally be a module, like a chip, circuitry on a chip or a plug-in board, for a server or for any other device. Optionally, apparatus 100 could comprise various other components, like a data interface, a user interface, a further memory, a further processor, etc.

An operation of apparatus 100 will now be described with reference to the flow chart of FIG. 2. The operation is an exemplary first embodiment of a method according to the invention. Processor 101 and the program code stored in memory 102 cause an apparatus to perform the operation when the program code is retrieved from memory 102 and executed by processor 101. The apparatus that is caused to perform the operation can be apparatus 100 or some other apparatus, for example but not necessarily a device comprising apparatus 100.

The apparatus obtains information for radio channel modeling by checking at least one measurement based value of at least one set of measurement based values of a plurality of sets of measurement based values based on at least one timing measurement value, wherein each set of measurement based values originates from a respective mobile terminal in a communication network. (action 111)

The apparatus performs a radio channel modeling based on the obtained information. (action 112)

The invention proceeds from the consideration that many mobile terminals can collect at least one set of measurement based values, wherein each set of measurement based value comprises at least one measurement based value. Such a set of measurement based values may be sampled by a mobile device at a location in the communication network and may be considered as a fingerprint.

As an example, the communication system may represent a cellular communication system, for instance a global system for mobile communications (GSM), a 3rd Generation Partnership Project (3GPP) based cellular system like a wide-band code division multiple access (WCDMA) system or a time division synchronous CDMA (TD-SCDMA) system, a 3GPP2 system like a CDMA2000 system, a long term evolution (LTE) or LTE-Advanced system, or any other type of cellular system, like a worldwide interoperability for microwave access (WiMAX) system. Or, as another example, the communication system may represent a non-cellular communication system, like WLAN, Bluetooth and Zigbee, etc. The node of a cellular communication system could be for instance a transceiver or a base station of the cellular communication system.

For instance, said measurement based values may comprise at least one of a location related value, a signal strength measurement value, and a timing measurement value. The location related value may represent a location estimate based on a Global Navigation Satellite System (GNSS) or WLAN measurement performed by the mobile device. The signal strength measurement value may represent a received signal strength value of a signal received from a node of the communication network. In general, a node of a cellular communication system could be an entity serving exactly one cell, or an entity serving a plurality of cells from a single position. The node of a non-cellular communication system could be an access point like a WLAN access point in a WLAN system.

As an example, in the case of measurements on cellular signals, the measurement based values of a set of measurement based values may contain a global and/or local identification of the cellular network cells observed, their signal strengths and/or pathlosses and/or timing measurements like timing advance (TA) or round-trip time. As a further example, for measurements on wireless local area network (WLAN) signals, as an example of signals of a non-cellular system, the measurement based values of a set of measurement based values may contain a basic service set identification (BSSID), like the medium access control (MAC) address of observed access points (APs), the service set identifier (SSID) of the access points, and the signal strength of received signals (received signal strength indication RSSI or physical Rx level in dBm with a reference value of 1 mW, etc.) and/or timing measurements like timing advance (TA) or round-trip time.

Such sets of measurement based values may be captured by a plurality of mobile terminals and may be transmitted to a server or a cloud which may be configured to collect large global databases containing the received sets of measurement based values originating from the plurality of mobile terminals. The at least one apparatus 100 depicted in FIG. 1 may be part of such a server or a cloud or may represent such a server.

The at least one apparatus 100 may be configured to generate models of wireless communications nodes for positioning purposes, wherein such models may for instance coverage areas, node positions, radio propagation models, etc. As an example, such models may be transmitted back to the user terminals for use in position determination.

Figure 2:
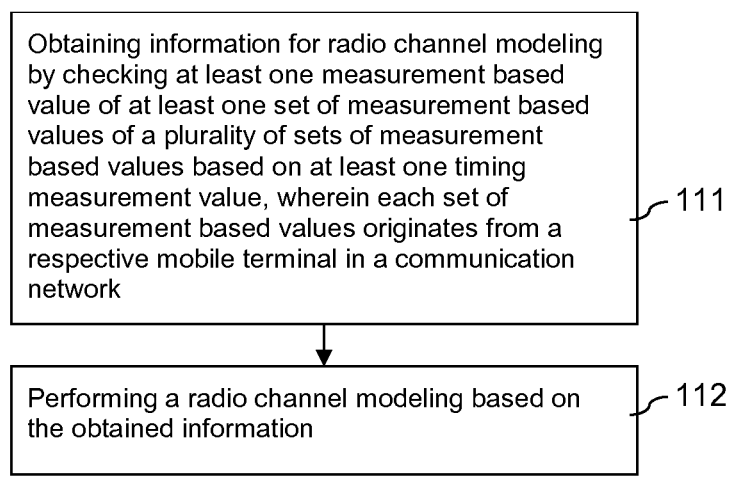
FIG. 2 is a flow chart illustrating an exemplary first embodiment of a method.

Such a radio channel modeling can be performed by the at least one apparatus (action 112) based on information for radio channel modeling obtained through action 111 of the method depicted in FIG. 2. Please note that actions 111 and 112 may be performed by the same apparatus or by different apparatuses. This information for radio channel modeling is obtained by checking at least one measurement based value of at least one set of measurement based values of the plurality of sets of measurement based values, wherein said checking is based on at least one timing measurement value. For instance, if a measurement based value of a set of measurement based values is checked, this checking may be performed based on the timing measurement value of this set of measurement based values.

As a non-limiting example, the quality or plausibility of a measurement based value of a set of measurement based values may be checked based on the timing measurement value of this set of measurement based values, and information on this check may be used for radio channel modeling. For instance, a measurement based value which is checked to be non-plausible may represent an outlier and may not be used for radio channel modeling.

Furthermore, as a non-limiting example, the checked at least one measurement based value may represent at least one timing measurement value of at least one set of measurement based values.

At least one apparatus 100 illustrated in FIG. 1 and the operation illustrated in FIG. 2 may be implemented and refined in various ways.

In an exemplary embodiment, said timing measurement value represents a round-trip time.

For instance, said round-trip time may represent a measure of time for transmission between the terminal and a node of a cellular network or a non-cellular network.

In an exemplary embodiment, said timing measurement value represents a timing advance.

For instance, timing advance may represent a measure of the Round-Trip distance between the terminal and a node of a cellular network. As an example, timing advance may be used in Time-Division Duplex communication networks, in which multiple terminals operate on the same frequency. Thus the signals from different terminals (at different distances from the base station) need to be sent at different times so that they arrive in a determined order at the base station. Timing advance may represent the "delta-time" the terminal needs to apply to its transmission times so that the signals from different terminals do not interfere with each other. For instance, based on the measured timing advance the distance between the respective mobile terminal which measured the timing advance and the respective node can be estimated. Granularity of measurement of timing advance depends on the air interface type of the respective communication network.

In an exemplary embodiment, a set of measurement based values of the plurality of sets of measurement based values comprises a signal strength measurement value and a timing measurement value. The signal strength measurement value may represent an Rx level value as an indication of received signal strengths at the respective mobile terminal.

In an exemplary embodiment, said information for radio channel modeling comprises outlier information indicative that a measurement based value of a set of measurement based values represents an outlier.

For instance, if a measurement based value of a set of measurement based values is detected to represent an outlier, said outlier information indicative that this measurement based value of this set of measurement based values represents an outlier may be used in such a way that this measurement based value is not used for radio channel modeling, e.g. the respective measurement based value may be discarded or neglected.

Accordingly, said checking may comprise determining whether a measurement based value of a set of measurement based values represents an outlier based on the timing measurement value of this set of measurement based values.

In an exemplary embodiment, said information for radio channel modeling comprises information indicative which set of measurement based values of at least two sets of measurement based values of the plurality of sets of measurements based values is associated with a nearer position to a node of the communication network. For instance, said node may represent a predefined node in the communication network which might for instance be selected from at least one node of the communication network.

In an exemplary embodiment, it is checked whether multiple peaks of signal strength measurement values occur in at least two sets of measurement based values of the plurality of sets of measurement based values, and, if said checking yields a positive result, checking which of said at least two sets of measurement based values is associated with the smallest timing measurement value and assigning said information indicative which set of measurement based values of at least two sets of measurement based values of the plurality of sets of measurements based values is associated with a nearer position to the set of measurement based values associated with the smallest timing measurement value is performed.

For instance, the at least two sets of measurement based values may represent at least three or more sets of measurement based values. The multiple peaks of signal strength measurement values may be detected in multiple different sets of measurement based values, wherein each of the signal strength measurement value of the multiple is associated with a different set of measurement based values.

In an exemplary embodiment, a set of measurement based values of the plurality of sets of measurement based values comprises a location related value and wherein said outlier information associated with at least one set of measurement based values is indicative that the location related value of said at least one set of measurement based values represents an outlier. For instance, the position related value may represent an absolute position value (e.g. coordinates of a location) or a relative position value (e.g. a distance to a respective node of the communication network). As an example, if the outlier information indicates that at least one location related value represents an outlier, this location related value may not be used for performing radio channel modeling.

In an exemplary embodiment, for each set of measurement based values of at least one set of measurement based values a location related reference value based on a timing measurement value of the respective set of measurement based values is determined and it is checked whether the location information of the location related value and location information of the location related reference value associated with the respective set of measurement based values significantly deviate from each other, and, if said checking yields a positive result, an outlier information to the respective set of measurement based values is assigned.

In an exemplary embodiment, said information for radio channel modeling comprises information indicative of at least one set of measurement based values of the plurality of sets of measurement based values intended to be used for performing the radio channel modeling. Thus, for instance, radio channel modeling may be started based on the sets of measurement based values indicated by this information or may only performed based on the on the sets of measurement based values indicated by this information.

In an exemplary embodiment, for each set of measurement based values of at least one set of measurement based values of the plurality of sets of measurement it is checked whether the timing measurement value of the respective set of measurement based values is below a predefined threshold, and if said checking yields a positive result, the respective set of measurement based values is assigned as set of measurement based values intended to be used for performing the radio channel modeling.

For instance, it may be assumed that a timing measurement value is proportional to the distance between the respective location of the mobile terminal when capturing the timing measurement value and the respective node of the communication network, wherein this proportionality depends on the speed of light and wherein the distance d may be calculated as follows:

$$d=(c*T)/2;$$

wherein c represents the speed of light and T represent the timing measurement value, which may for instance represent the round-trip time between the mobile terminal and the node or the timing advance between the mobile terminal and the node. Accordingly, as an example, the predefined threshold may corresponds to a predefined distance, such that a respective set of measurement based values is assigned as set of measurement based values intended to be used for performing the radio channel modeling if the distance is below the predefined threshold.

In an exemplary embodiment, said information for radio channel modeling comprises information regarding a move of a node of the communication network, wherein it is proposed to determine a first subarea associated with at least one set of measurement based values, wherein each timing measurement value of said at least one set of measurement based values is below a predefined threshold, and to check whether there is a second subarea associated with at least one set of measurement based values, wherein each timing measurement value of said at least one set of measurement based values is below a predefined threshold and wherein the second subarea is not a direct neighbor to the first subarea, and if this checking yields a positive result, setting said information regarding a move of a node to be positive.

In an exemplary embodiment, said radio channel modeling is at least partially reset if the information regarding a move of a node is positive. For instance, this reset may comprise resetting the plurality of sets of measured based values associated with a respective node since due to the movement of the nodes the measured based values being capture before movement are not valid anymore and it may not be possible to distinguish whether a set of measured based values was captured before or after movement of the node.

In an exemplary embodiment, at least one measured based value of a set of measurement based values of the plurality of sets of measurement based values is associated with a grid point of a virtual grid, each grid point corresponding to a real location. For instance, a set of measurement based values may comprise location related information, wherein the real location may be estimated based on this location related information. For instance, one grid may be associated with signal strength measurement values and another grid may be associated with timing measurement values.

Thus, as an example, each set of measurement based values may be associated with a respective different grid point of the virtual grid. Furthermore, as mentioned above, a plurality of grids may be defined, wherein each grid of the plurality of grids may be associated with the same real area and is associated with a specific type of measurement based value. As an example, one type of measurement based values may represent a signal strength type such that a signal strength value of a respective set of measurement based value is associated with a grid point in the grid associated with signal strength measurement values. Thus, said grid associated with signal strength measurement values may comprise a plurality of signal strength values, wherein each signal strength value of the plurality of signal strength values is associated with a respective different grid point in accordance with the respective set of measurements based value associated with this signal strength value. As another example, one type of measurement based values may represent a timing measurement type such that a timing measurement value of a respective set of measurement based value is associated with a grid point in the grid associated with timing measurement values. Thus, said grid associated with timing measurement values may comprise a plurality of timing measurement values, wherein each timing measurement values of the plurality of timing measurement values is associated with a respective different grid points in accordance with the respective set of measurements based value associated with this timing measurement value. Accordingly, for instance, measurement based values of a plurality of sets of measurement based values may be mapped on respective grids.

In an exemplary embodiment, said radio channel modeling comprises finding the location of a node of communication network.

Figure 3:
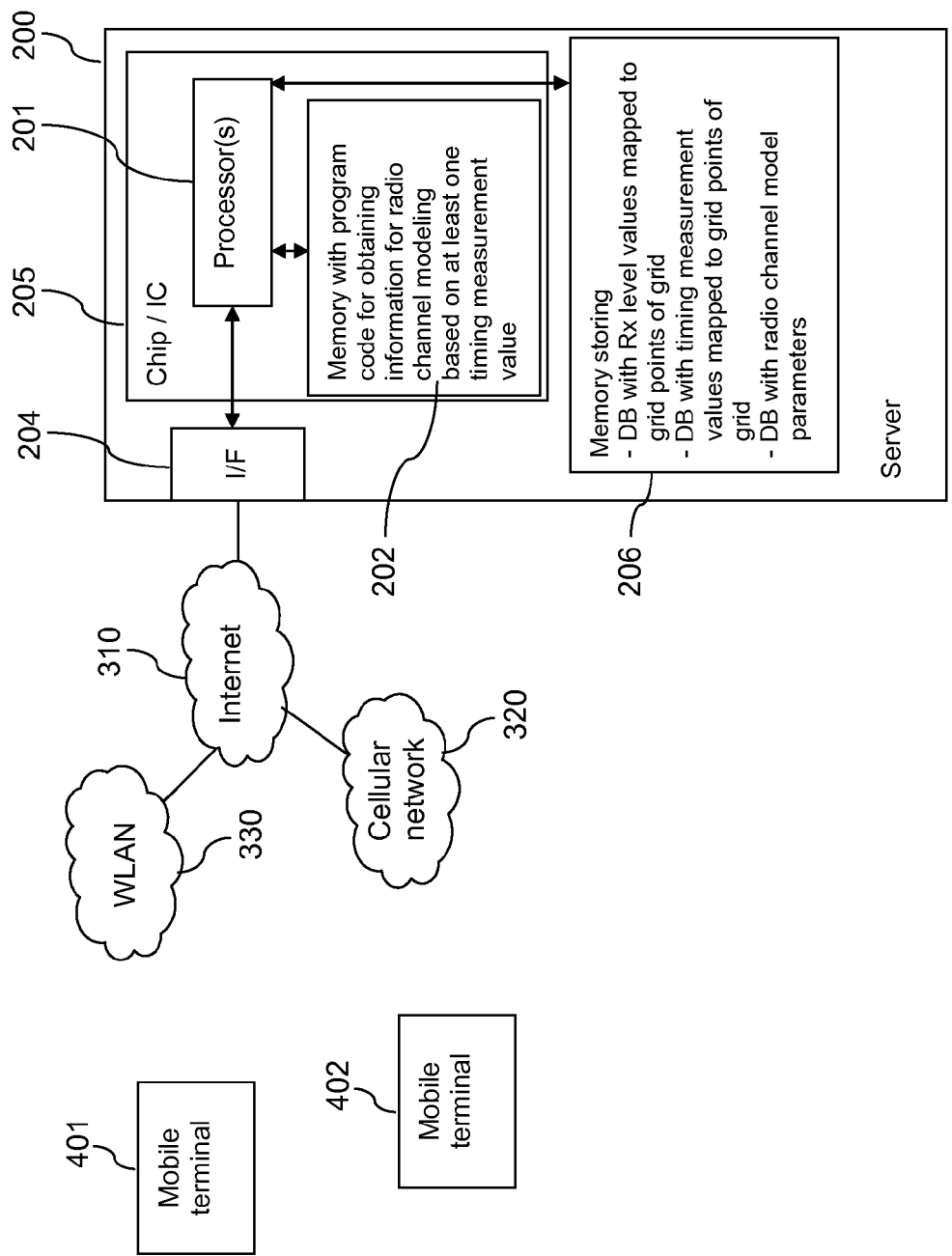
FIG. 3 is a schematic block diagram of an exemplary embodiment of a system.

FIG. 3 is a schematic block diagram of a system supporting a obtaining information for radio channel modeling by checking at least one measurement based value of at least one set of measurement based values of a plurality of sets of measurement based values based on at least one timing measurement value, wherein each set of measurement based values originates from a respective mobile terminal in a communication network, and for performing a radio channel modeling based on the obtained information.

The system comprises a server 200. Server 200 is connected to a network 310, for example the Internet. Server 200 could also belong to network 310. Network 310 is suited to interconnect server 200 with other servers (not shown) and/or with mobile terminals 401, 402 via a cellular network 320 or via any of a plurality of WLANs 330.

Server 200 may provide or support a system for building up and updating a radio channel model database. Server 200 may be for instance a dedicated positioning server, a dedicated position data learning server, or some other kind of server. It comprises a processor 201 that is linked to a first memory 202, to a second memory 206 and to an interface (I/F) 204. Processor 201 is configured to execute computer program code, including computer program code stored in memory 202, in order to cause server 200 to perform desired actions.

Memory 202 stores computer program code for obtaining information for radio channel modeling by checking at least one measurement based value of at least one set of measurement based values of a plurality of sets of measurement based values based on at least one timing measurement value and may store computer program code for generating radio channel model parameters based on the obtained information. The computer program code may comprise for example at least similar program code as memory 102. The memory 202 could comprise in addition program code for collecting and storing fingerprint data provided by mobile terminals and/or program code supporting a positioning of mobile terminals. In addition, memory 202 may store computer program code implemented to realize other functions, as well as any kind of other data. It is to be understood, though, that program code for any other actions than supporting a generation of radio channel model parameters could also be implemented on one or more other physical and/or virtual servers.

Processor 201 and memory 202 may optionally belong to a chip or an integrated circuit 205, which may comprise in addition various other components, for instance a further processor or memory.

Memory 206 stores at least one radio channel model database (DB) that is configured to comprise radio channel model parameters. Memory 206 may further store a fingerprint database with measurement based values of sets of measurement based values for nodes of cellular communication network 320 and/or for nodes of WLANs 330. Memory 206 may further store configuration settings for each of a plurality of nodes and/or for one or more groups of nodes. In addition, memory 206 could store other data, for instance other data supporting a positioning of mobile terminals. It is to be understood that any of the databases and/or the configuration settings could also be stored in a memory that is external to server 200; such a memory could be for instance on another physical or virtual server.

Interface 204 is a component which enables server 200 to communicate with other servers or devices, like mobile terminals 401 and 402, via network 310. Interface 204 could comprise for instance a TCP/IP socket.

Component 205 or server 200 could correspond to exemplary embodiments of an apparatus according to the invention.

Cellular communication network 320 comprises a plurality of base stations operating as nodes of the network. Each WLAN 320 comprises at least one access point as a node of a communication network. Each of the nodes transmits signals that can be observed in a certain associated area. In the case of a cellular communication network 320, the area may comprise the area of one or more cells.

Mobile terminal 401 may comprise a GNSS receiver. Mobile terminals 401 may further be configured to perform measurements on signals from nodes of cellular communication network 320 or WLANs 330. Further, mobile terminal 401 may be configured to report measurement results taken at different locations to server 200 as measurement based values.

Mobile terminal 402 may equally be configured to perform measurements on signals from nodes of cellular communication network 320 or WLANs 330. In addition, it may be configured to generate location requests comprising results of such measurements to obtain an indication of its position. In addition or alternatively it may be configured to generate a request to be provided with radio channel model parameters and to determine its own position based on such parameters. The indication of its position and or the own position may be considered as location related values.

During an exemplary operation in the system of FIG. 3, mobile terminal 401 may receive satellite signals and determine its current position based on the satellite signals.

The current position may be considered as location related value. In addition, mobile terminal 401 may detect signals transmitted by one or more nodes of cellular network 320 for a respective cell. Mobile device 401 may assemble results of measurements on these signals, including Rx level values as an indication of received signal strengths. It may further associate an identification of a cell and thus of the node with the result or results for at least one cell, for instance a global cell identity and/or a local cell identity. In addition, mobile terminal 401 may detect signals transmitted by access points (AP) of one or more WLANs 330 and associate measurement results on these signals, including Rx level values as an indication of received signal strengths, with an identity of the WLAN APs. Furthermore, mobile terminal 401 may measure a round-trip time representing a measure of time for transmission between the mobile terminal 410 and a node of the WLAN network 330 or a node of the cellular network 320. For instance, with respect to the cellular network, said timing measure may represent a timing advance representing a measure of the Round-Trip distance between the mobile terminal 410 and a node of the cellular network 320. Mobile terminal 401 may then transmit the measurement results and the associated identifications along with an indication of the determined position (which may be considered as location related value) as a fingerprint in a message to server 200. The transmission may take place via WLAN 330 and network 310 or via cellular network 320 and network 310. It has to be noted that in an alternative embodiment, the position of mobile device 401 could also be determined based on some other positioning technology than GNSS. For instance, mobile terminal 401 could determine its position based on WLAN signals instead of GNSS signals. Mobile terminal 401 may transmit similar messages from various locations to server 200 while moving around. In addition, other mobile terminals may transmit corresponding messages to server 200.

Server 200 may store received Rx level values, received signal strength values, and possibly additional data, with a mapping to a grid point of a respective grid in a fingerprint database in memory 206 separately for each cell or node. The grid point of each grid may be determined based on the location related value being indicative position of mobile terminal 401. The data may be stored in various ways. Each grid could be represented for instance by a table that is stored in the fingerprint database in memory 206, and the measurement results and associated data could be inserted as an entry of the table. It is to be understood, however, that the storage of the data does not require storage of the entire grid or of a table corresponding to the entire grid. Since many grid points may not have any data associated with them so far, the data could be stored for instance efficiently using a run-length encoding in the fingerprint database. Further alternatively, the indices of the grid points, with which data are associated, followed by the respectively associated data could be stored in a sequence in the fingerprint database.

Figure 4:
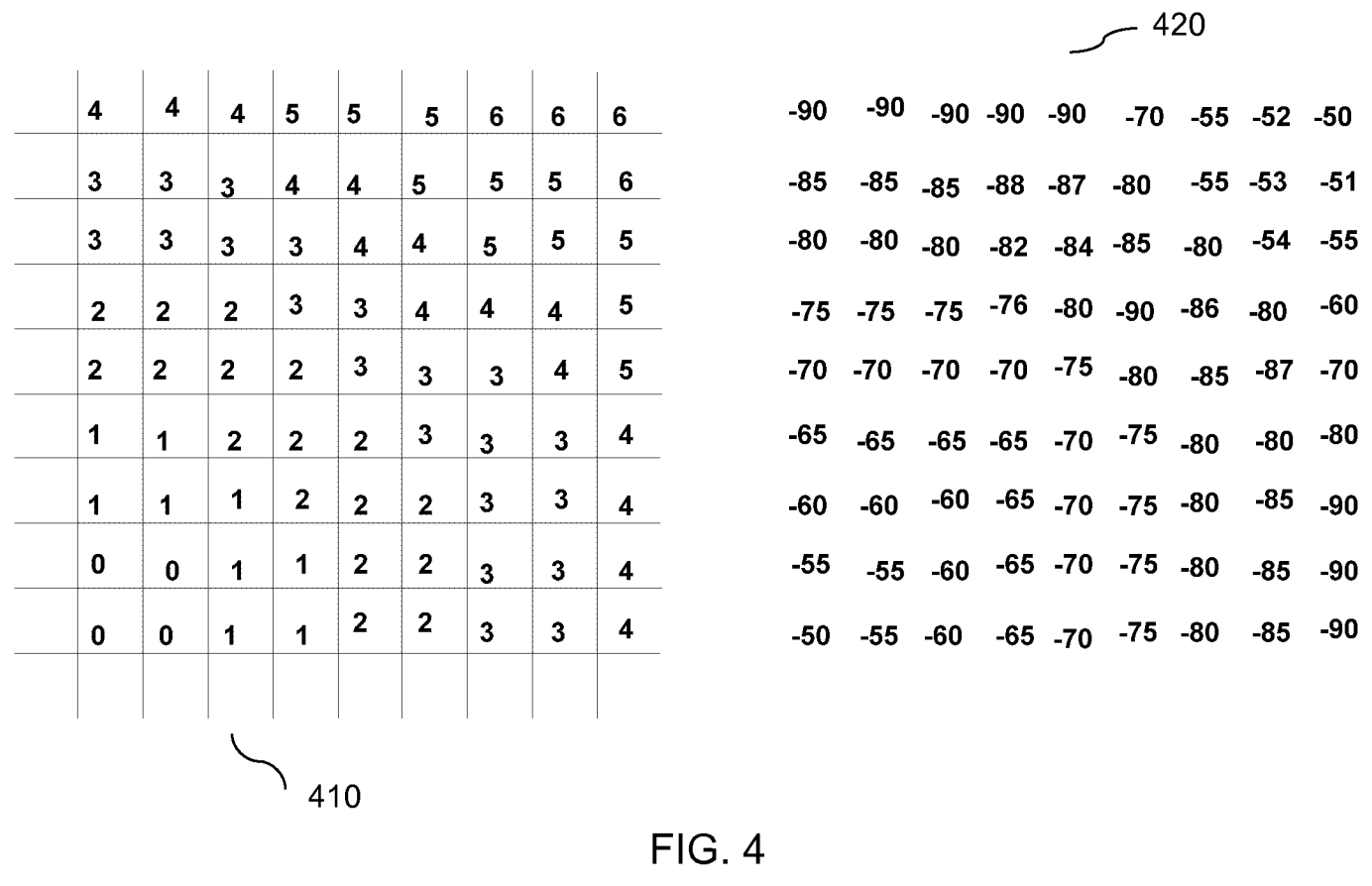

FIG. 4 depicts an example of a grid 420 of signal strength values representing Rx level values in dBm. Each grid point of grid 420 is associated with a respective real location. Furthermore, FIG. 4 depicts an example of a grid 410 of timing measurement values which may represent timing advances or round-trip times. Each grid point of grid 410 is associated with a respective real location. For instance, a grid point of grid 410 having a respective index is associated with the same real location as a grid point of grid 420 having the same index, wherein the timing measurement value of a grid point of grid 410 and respective signal strength value of the respective grid point of grid 420 are part of the same set of measurement based value being associated with this real location.

The Rx level data stored in memory 206 may for instance be used for regularly updating further models, for example radio channel models, or for supporting a positioning of mobile terminals directly.

Figure 5:
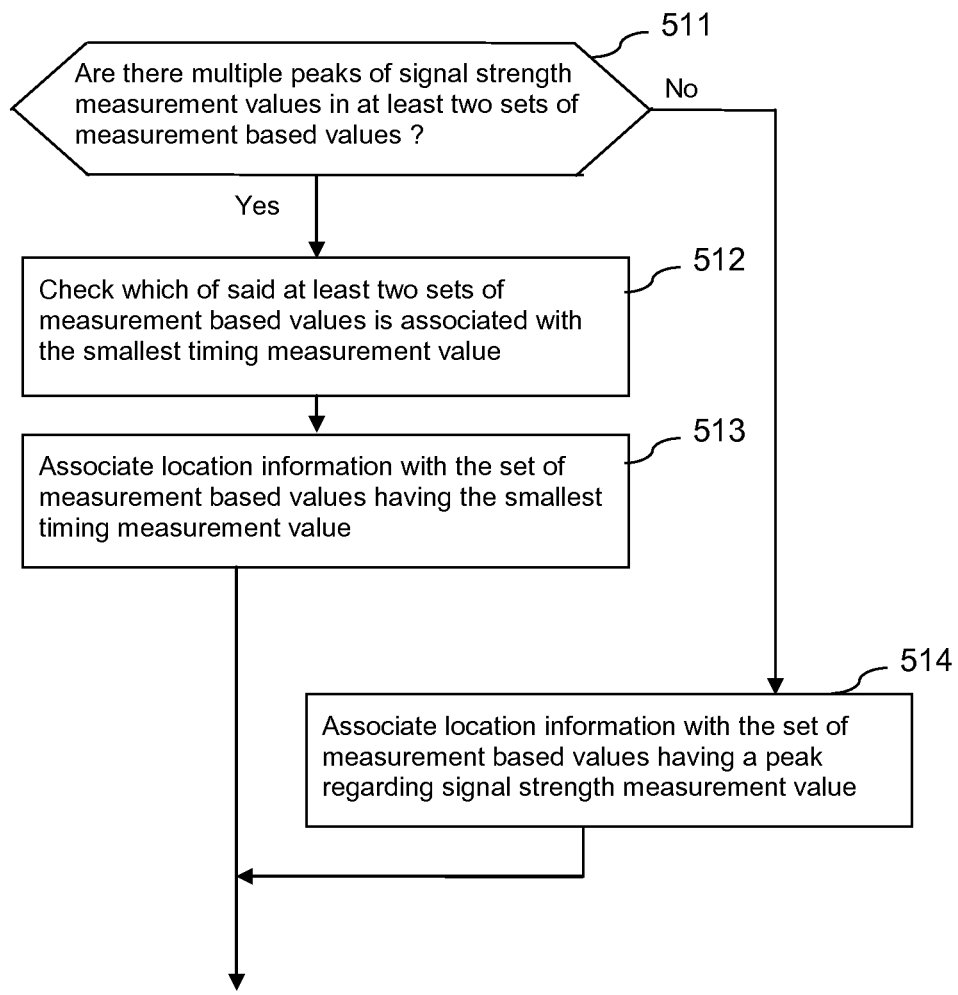
FIG. 5 is a flow chart illustrating an exemplary second embodiment of a method.

An exemplary operation at server 200 of the system of FIG. 3 will now be described with reference to the flow chart of FIG. 5. Processor 201 and the program code stored in memory 202 cause server 200 to perform the presented operations when the program code is retrieved from memory 202 and executed by processor 201.

For instance, server 200 may read Rx level values for a particular base station of cellular communication network 320, for which a radio channel model is to be generated, from the fingerprint database in memory 206. Or, as another example, the Rx level values of some other node, for instance of a WLAN AP, could be read. The Rx level values may be mapped to a grid point of a grid, e.g. as depicted by exemplary grid 420 in FIG. 4, and the mapping information is obtained as well when reading the Rx level values. The grid may cover an area in which signals from the base station can presumably be detected. Each grid point is associated with a particular location on Earth in the covered area.

Server 200 checks whether there are multiple peaks of signal strength measurement values in at least two sets of measurement based values, i.e. server 200 may check whether there are multiple peaks of Rx level values in the grid of Rx level values. (action 511) For instance, with respect to exemplary grid 420, a first peak of −50 dBm is in lower left corner of grid 420 and a second peak of −50 dBm is in upper right corner of grid 420.

A peak of a signal strength measurement value may usually be indicative that the node is in close distance, but in certain circumstances a peak of signal strength measurement may occur due to specific terrain effects which may lead to positive interference. For instance, in a hilly terrain the node may be arranged on top of a first hill and then there may be a valley and again a further hill, wherein a peak of signal strength measurement value also occurs on top of the further hill which is in line of sight with the first hill, wherein in an area (or several areas) between the first hill and the further hill, i.e., in the valley, there is non-line of sight with the node and thus lower signal strength measurement values though this area is closer to the node than the further hill. As an example, with respect to the example grid 420 depicted in FIG. 4, the transmitting node may be located at a position near the position of the lower left corner grid point resulting in peak of Rx level value of −50 dBm, wherein the peak of Rx level value of −50 dBm at the upper right corner grid may caused by terrain effect.

Thus, if there is more than one peak of signal strength measurement value, then it may be desired to evaluate which peak belongs to the transmitting node (i.e. is near to the transmitting node) and which peaks is due to terrain effects.

Accordingly, if the checking whether there are multiple peaks of signal strength measurement values yields a positive result, the server 200 checks which of said at least two sets of measurement based values is associated with the smallest timing measurement value. (action 512).

As explained above, the timing measurement value is indicative of the distance to the transmitting node. Thus, a small timing measurement value indicates that the location of the mobile terminal when capturing this timing measurement value and other measurement based values like the signal strength of the same set of measurement based values is nearer to the transmitting node than the location of another set of measurement based values comprising a timing measurement value being higher than small timing measurement value. Thus, based on this check the set of measurement based value of the at least two sets of measurement values can be determined which corresponds to a location at a near distance to the transmitting node, wherein the other sets of measurement value also having a peak of signal strength measurement values but having higher timing measurement values will likely correspond to locations at a farer distance to the transmitting node.

Thus, the server 200 may associate location information with the set of measurement based values of the at least two sets of measurement based values (each having a peak of signal strength measurement values) that has the smallest timing measurement value of the at least two sets of measurement based values in order to indicate that this set of measurement based values is associated with a nearer position to the transmitting node than the other sets of measurement based value of the at least two sets of measurement based values. (action 513)

Furthermore, for instance, this location information may be considered as a kind of outlier information since it is indicative that the other sets of measurement based values of the two sets of measurements based values (each having a peak of signal strength measurement values) represent outliers with respect to the signal strength measurement values, since the peaks of these signal strength measurement values are not caused by a short distance to the transmitting node but rather by interference effects.

If there is only one peak of signal measurement values, the server may proceed with optional action 514 may associate a location information with the set of measurement based values having this peak regarding signal strength measurement value, wherein this location information is indicative that this set of measurement based value is associated with the nearest position to the transmitting node from the plurality of sets of measurement based values.

Accordingly, when server 200 proceeds or may start with performing a radio channel modeling (action 112), based on checking performed in action 512 and the obtained information it is known which set of measurement based values, e.g. which peak Rx level value in grid 420 of FIG. 2 is associated with a nearest position to the respective transmitting node and peaks of Rx level values caused by interferences can be neglected for determining the position of the transmitting node.

A further exemplary operation at server 200 of the system of FIG. 3 will now be described with reference to the flow chart of FIG. 6. Processor 201 and the program code stored in memory 202 cause server 200 to perform the presented operations when the program code is retrieved from memory 202 and executed by processor 201.

Server 200 selects a set of measurement based values for which an outlier detection should be performed. (action 611). In this example, it is assumed that the selected set of measurement based value comprises a location related information. For instance, this location related information may represent positioning information determined by the mobile terminal, e.g. GNSS-based position information or other position information.

Server 200 determines a location related reference value based on a timing measurement value of the selected set of measurement based values. (action 612) For instance, this location related reference may represent a distance to the transmitting node which may be calculated based on the timing advance and the speed of light.

Server 200 then checks whether location information of the location related reference value deviates significantly from location information of the location value of the selected set of measurement based values. (action 613). For instance, with respect to this example, the location information of the location value may represent the distance from the mobile terminal which captured the set of measurement based values to the position of the transmitting node, wherein it may be assumed that the position of the transmitting node is already known to the server 200, e.g. based on the exemplary operation depicted in FIG. 5. In general, for this example it is important that the position of the transmitting node is known with high certainty.

As an example, a threshold may be defined, and if the difference between the location information of the location reference value and the location information of the location value is higher that this threshold, said deviating is determined and the checking in action 613 yields a positive result.

As an example, if the location reference value indicates a distance of two kilometers to the transmitting nod and if the location value indicates a distance of five kilometers, it is obvious that the location value of the selected set of measurement based values represents an outlier such that the checking performed in action 613 yields a positive result.

If said checking yields a positive result, server 200 assigns an outlier information to the selected set of measurement based values, wherein this outlier information may represent an outlier information that the location value of this selected set of measurement based values represents an outlier.

Figure 6:
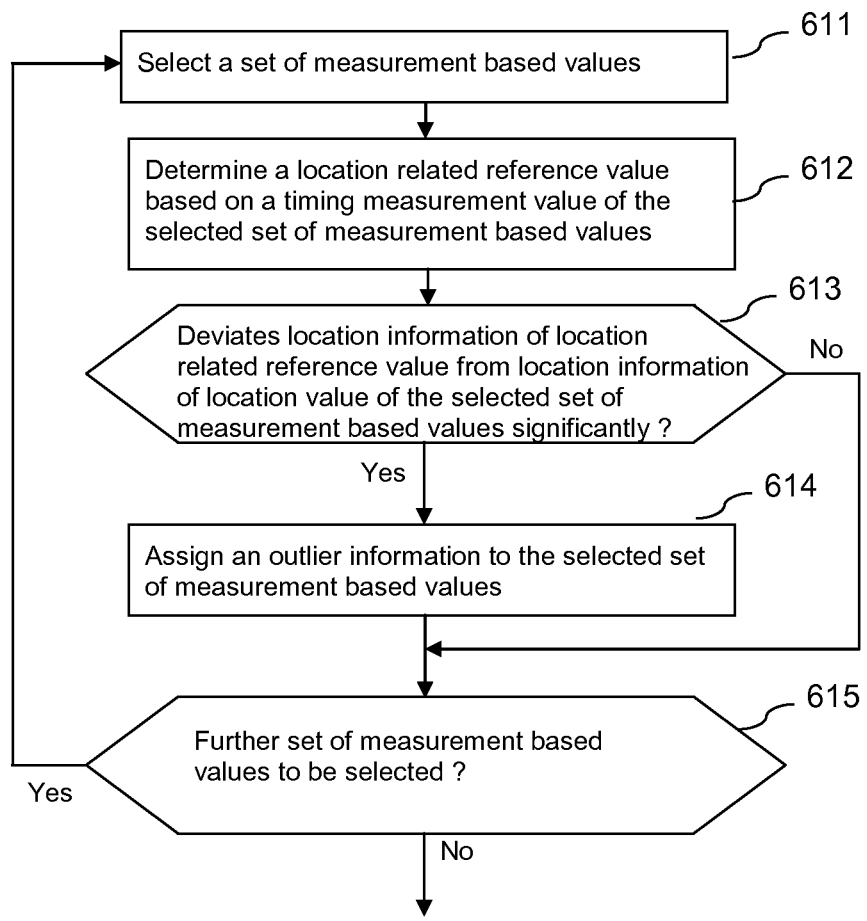
FIG. 6 is a flow chart illustrating an exemplary third embodiment of a method.

For instance, in this way, one or a plurality of sets of measurement based data may be checked regarding outliners, as indicated by action 615 depicted in FIG. 6.

A further exemplary operation at server 200 of the system of FIG. 3 will now be described with reference to the flow chart of FIG. 7. Processor 201 and the program code stored in memory 202 cause server 200 to perform the presented operations when the program code is retrieved from memory 202 and executed by processor 201.

This exemplary operation may for instance be used to select those sets of measurement based values that are to be used for the node position determination, i.e., as an example, those grid points that are to be used for node position determination.

Server 200 selects a set of measurement based values for which an outlier detection should be performed. (action 711).

Server 200 checks whether the timing measurement value of the selected set of measurement based values is below a predefined threshold. (action 712).

For instance, it may be assumed that a timing measurement value is proportional to the distance between the respective location of the mobile terminal 410 when capturing the timing measurement value and the respective node 320, 330 of the communication network, wherein this proportionality depends on the speed of light and wherein the distance d may be calculated as follows:

$$d=(c*T)/2;$$

wherein c represents the speed of light and T represent the timing measurement value, which may for instance represent the round-trip time between the mobile terminal 410 and the node 330 or the timing advance between the mobile terminal 410 and the node 320. Accordingly, as an example, the predefined threshold may corresponds to a predefined distance, such that a respective set of measurement based values is assigned as set of measurement based values intended to be used for performing the radio channel modeling if the distance is below the predefined threshold.

If this checking yields a positive result, server 200 assigns the selected set of measurement based values as set intended to be used for performing radio channel modeling. This assignment can be considered as information indicative of a set of measurement based value intended to be used for performing the radio channel modeling and may be part of the information for radio channel modeling.

Figure 7:
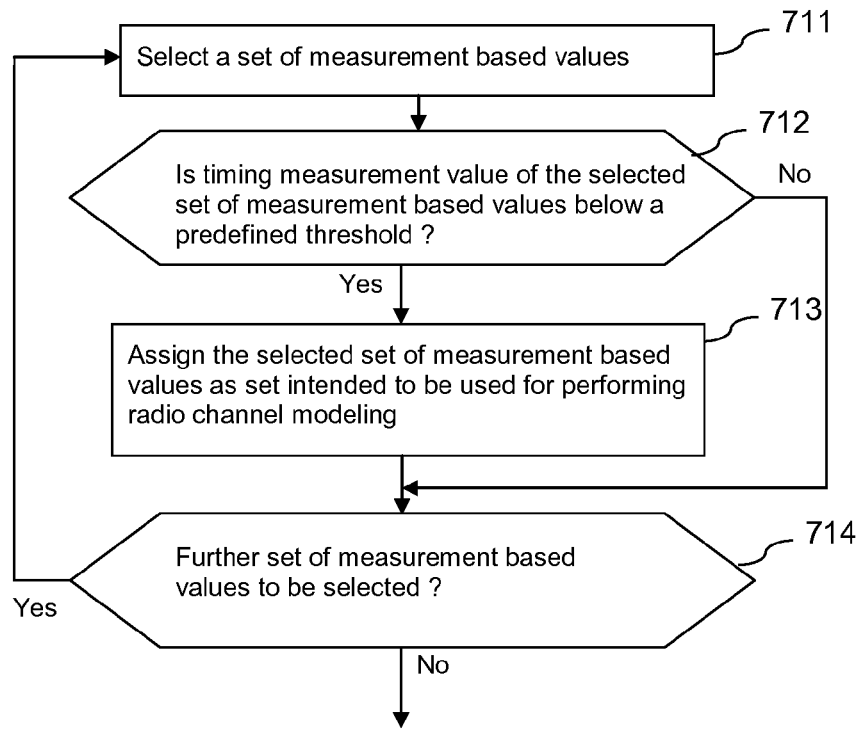
FIG. 7 is a flow chart illustrating an exemplary fourth embodiment of a method.

In this way, as an example, a plurality of sets of measurement based values may be checked as indicated by the loop between actions 711 and 714 in FIG. 7. Accordingly, only those sets of measurement based values are selected that are to be used for radio channel modeling which are associated with a position very near to the transmitting node.

As an example, said predefined threshold may be set to timing advance=1, i.e. the checking is only positive if the timing advance is less than 1. With respect to the example grid 410 depicted in FIG. 4, only the four sets of measurement based values associated with the four time advances=0 in the lower left corner will be selected to be used for radio channel modeling. It has to be understood that other predefined thresholds may be applied.

Afterwards, based on the information indicative of at least one set of measurement based values intended to be used for performing the radio channel modeling, server 200 may proceed with determining the position of the transmitting node, e.g. based on the signal strength measurement values of this at least one set of measurement based values indicated by the information indicative of at least one set of measurement based values intended to be used for performing the radio channel modeling.

Figure 8:
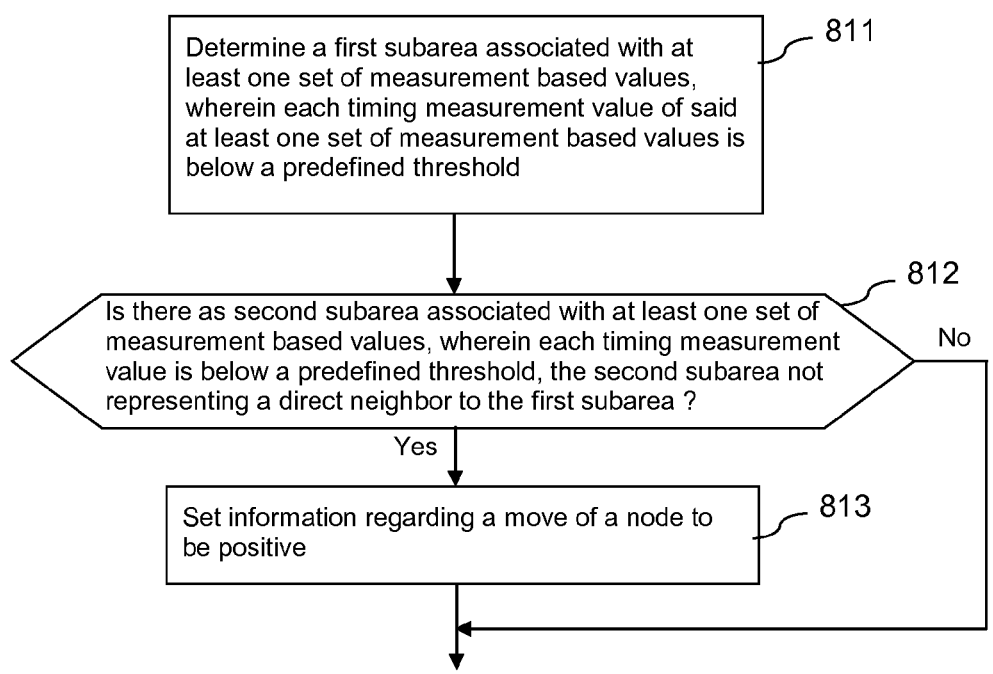
FIG. 8 is a flow chart illustrating an exemplary fifth embodiment of a method.

A further exemplary operation at server 200 of the system of FIG. 3 will now be described with reference to the flow chart of FIG. 8. Processor 201 and the program code stored in memory 202 cause server 200 to perform the presented operations when the program code is retrieved from memory 202 and executed by processor 201.

Server 200 determines a first subarea associated with at least one set of measurement based values, wherein each timing measurement value of said at least one set of measurement based values is below a predefined threshold. (action 811). For instance, with respect to a grid of timing measurement based values, said first subarea may be defined by at least one grid position, wherein each timing measurement value associated with this at least one grid position is below the predefined threshold and, if at least one grid position are a plurality of grid positions, these plurality of grid positions form a subarea. This, this first subarea indicates a subarea very close or comprising the transmitting node. As an example, the predefined threshold may be chosen as explained with respect to FIG. 7. For instance, with respect to grid 410 depicted in FIG. 4, the four grid positions at the lower left corner may defined such a first subarea.

The server 200 then checks whether there is a second subarea associated with at least one set of measurement based values, wherein each timing measurement value of said at least one set of measurement based values is below a predefined threshold and wherein the second subarea is not a direct neighbor to the first subarea. (action 812). The predefined threshold value may be the same as mentioned above.

For instance, the grid 410 depicted in FIG. 4 does not show such a second subarea with respect to the first subarea. But, as an example, if the transmitting node of the communication node may have moved during capturing the fingerprints, e.g. from the location in the lower left corner to a location in the upper right corner of grid 410, there would also be timing advance having a very small value (e.g. 0) in the upper right corner of grid 410, and checking whether there is a second subarea during action 812 would yield a positive result, since these grid positions in the upper right corner would be define a second subarea associated with at least one set of measurement based values, wherein each timing measurement value of said at least one set of measurement based values is below a predefined threshold, wherein this second subarea is not a direct neighbor to the first subarea. Furthermore, this would confirm that peak signal strength measurement values associated with the second subarea are not caused by interference effect but caused due to a move of the node from the lower left corner to the upper right corner.

Accordingly, if the checking performed in action 812 yields a positive result, server 200 sets information regarding a move of a node to be positive. Then, for instance, said radio channel modeling is at least partially reset if the information regarding a move of a node is positive.

For instance, this reset may comprise resetting the plurality of sets of measured based values associated with a respective node since due to the movement of the nodes the measured based values being capture before movement are not valid anymore and it may not be possible to distinguish whether a set of measured based values was captured before or after movement of the node. As an example, the grid 410 and the grid 420 (and, e.g., any other grid associated with this node) may be reset and the server 200 may start collecting signal strength measurement and timing measurement value, i.e., for instance, collecting new sets of measurement based values for this node again.

Summarized, reliable and accurate radio channel modeling in problematic cases and/or robust outlier detection may be performed.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory, a random access memory, a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The functions illustrated by processor 101 in combination with memory 102 or the integrated circuit 205 can also be viewed as means for obtaining information for radio channel modeling by checking at least one measurement based value of at least one set of measurement based values of a plurality of sets of measurement based values based on at least one timing measurement value, wherein each set of measurement based values originates from a respective mobile terminal in a communication network, and means for performing a radio channel modeling based on the obtained information.

The program codes in memories 102 as well as 202, by themselves or in combination, can also be viewed as comprising such means in the form of functional modules.

FIGS. 2, 5, 6, 7 and 8 may also be understood to represent exemplary functional blocks of computer program codes supporting obtaining information for radio channel modeling It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an exemplary embodiment in a particular category may also be used in a corresponding manner in an exemplary embodiment of any other category. It will further be understood that the term "timing advance" used for cellular networks throughout the description may be replaced with the term "round-trip time" used for non-cellular networks and vice versa.

What is claimed is:

1. A method by at least one apparatus, the method comprising:
   receiving, by the at least one apparatus, at least one radio frequency signal comprising a plurality of sets of measurement based values from at least one respective mobile terminal in a communication network;
   obtaining information for radio channel modeling by checking at least one measurement based value of at least one set of the measurement based values of the plurality of sets of the measurement based values based on at least one timing measurement value, where information for radio channel modeling comprises location information indicative which set of the measurement based values of at least two sets of measurement based values of the plurality of sets of measurements based values is associated with a nearer position to a node of the communication network;
   checking whether multiple peaks of signal strength measurement values occur in the at least two sets of measurement based values of the plurality of sets of measurement based values, and, if said checking yields a positive result, to check which of said at least two sets of measurement based values is associated with a smallest timing measurement value and assigning said location information to the set of measurement based values associated with the smallest timing measurement value;
   performing a radio channel modeling based on the obtained information to generate a radio channel model for at least one node in the communication network, wherein a position associated with the at least one node is determined based on the radio channel model.

2. The method according to claim 1, wherein said timing measurement value represents a round-trip time or a timing advance.

3. The method according to claim 1, wherein said information for radio channel modeling comprises outlier information indicative that a measurement based value of the set of measurement based values represents an outlier.

4. The method according to claim 1, further comprising:
   updating a radio channel model database based on the performed radio channel modeling.

5. A system comprising at least one processor and at least one memory including computer program code, the at least one memory and the computer program code configured to, with the at least one processor, cause at least one apparatus at least to perform:
   receive a plurality of sets of measurement based values from at least one respective mobile terminal in a communication network;
   obtain information for radio channel modeling by checking at least one measurement based value of at least one set of the measurement based values of the plurality of sets of the measurement based values based on at least one timing measurement value, where information for radio channel modeling comprises location information indicative which set of measurement based values of at least two sets of measurement based values of the plurality of sets of measurements based values is associated with a nearer position to a node of the communication network;
   check whether multiple peaks of signal strength measurement values occur in the at least two sets of measurement based values of the plurality of sets of measurement based values, and, if said checking yields a positive result, to check which of said at least two sets of measurement based values is associated with the smallest timing measurement value and assigning said location information to the set of measurement based values associated with the smallest timing measurement value; and
   perform a radio channel modeling based on the obtained information to generate a radio channel model for at least one node in the communication network, wherein a position associated with the at least one node is determined based on the radio channel model.

6. The system according to claim 5, wherein said timing measurement value represents a round-trip time or a timing advance.

7. The system according to claim 5, wherein said information for radio channel modeling comprises outlier information indicative that a measurement based value of a set of measurement based values represents an outlier.

8. The system according to claim 7 wherein a set of measurement based values of the plurality of sets of measurement based values comprises a location related value and wherein said outlier information associated with at least one set of measurement based values is indicative that the location related value of said at least one set of measurement based values represents an outlier.

9. The system according to claim 8, wherein the computer program code is configured to, with the at least one processor, cause the at least one apparatus for each set of measurement based values of at least one set of measurement based values:
   determine a location related reference value based on a timing measurement value of the respective set of measurement based values;
   check whether the location information of the location related value and location information of the location related reference value associated with the respective set of measurement based values significantly deviate from each other, and, if said checking yields a positive result, to assign an outlier information to the respective set of measurement based values.

10. The system according to claim 5, wherein said information for radio channel modeling comprises information indicative of at least one set of measurement based values of the plurality of sets of measurement based values intended to be used for performing the radio channel modeling.

11. The system according to claim 10, wherein the computer program code is configured to, with the at least one processor, cause the at least one apparatus for each set of measurement based values of at least one set of measurement based values of the plurality of sets of measurement:
   to check whether the timing measurement value of the respective set of measurement based values is below a predefined threshold, and if said checking yields a positive result, to assign the respective set of measurement based values as set of measurement based values intended to be used for performing the radio channel modeling.

12. The system according to claim 5, wherein said information for radio channel modeling comprises information regarding a move of a node of the communication network, and wherein the computer program code is configured to, with the at least one processor, cause the at least one apparatus:

to determine a first subarea associated with at least one set of measurement based values, wherein each timing measurement value of said at least one set of measurement based values is below a predefined threshold; and to check whether there is a second subarea associated with at least one set of measurement based values, wherein each timing measurement value of said at least one set of measurement based values is below a predefined threshold and wherein the second subarea is not a direct neighbor to the first subarea, and if this checking yields a positive result, to set said information regarding a move of a node to be positive.

13. The system according to claim 12, wherein said radio channel modeling is reset if the information regarding a move of a node is positive.

14. The system according to claim 5, wherein a set of measurement based values of the at least one set of measurement based values is associated with a grid point of a virtual grid, each grid point corresponding to a real location.

15. The system according to claim 5, wherein said radio channel modeling comprises finding the location of a node of communication network.

16. The system according to claim 5, wherein the system is at least one of:
an apparatus;
a server;
a component for a server;
a plurality of apparatuses; and
a plurality of servers.

17. A non-transitory computer readable storage medium in which computer program code is stored, the computer program code when executed by a processor causing at least one apparatus to perform the following:
determine reception of a plurality of sets of measurement based values from at least one respective mobile terminal in a communication network;
obtain information for radio channel modeling by checking at least one measurement based value of at least one set of the measurement based values of the plurality of sets of the measurement based values based on at least one timing measurement value, where information for radio channel modeling comprises location information indicative which set of measurement based values of at least two sets of measurement based values of the plurality of sets of measurements based values is associated with a nearer position to a node of the communication network;
check whether multiple peaks of signal strength measurement values occur in the at least two sets of measurement based values of the plurality of sets of measurement based values, and, if said checking yields a positive result, to check which of said at least two sets of measurement based values is associated with the smallest timing measurement value and assigning said location information to the set of measurement based values associated with the smallest timing measurement value; and
perform a radio channel modeling based on the obtained information to generate a radio channel model for at least one node in the communication network, wherein a position associated with the at least one node is determined based on the radio channel model.

18. The non-transitory computer readable storage medium as claimed in claim 17, wherein said at least one timing measurement value represents a round-trip time or a timing advance.

19. The non-transitory computer readable storage medium as claimed in claim 17, wherein said information for radio channel modeling comprises outlier information indicative that a measurement based value of a set of measurement based values represents an outlier.

20. The non-transitory computer readable storage medium as claimed in claim 17, wherein a set of measurement based values of the plurality of sets of measurement based values comprises a location related value and wherein said outlier information associated with at least one set of measurement based values is indicative that the location related value of said at least one set of measurement based values represents an outlier.

* * * * *